US007077040B1

(12) United States Patent
Carbonaro

(10) Patent No.: US 7,077,040 B1
(45) Date of Patent: Jul. 18, 2006

(54) SHRINK WRAP AND SECURITY TAPE OPENING APPARATUS AND METHOD

(76) Inventor: Gregory Scott Carbonaro, 22523 Willow Lakes Dr., Lutz, FL (US) 33549

( * ) Notice: Subject to any disclaimer, the term of this patent is extended or adjusted under 35 U.S.C. 154(b) by 73 days.

(21) Appl. No.: 11/006,148

(22) Filed: Dec. 7, 2004

Related U.S. Application Data

(60) Provisional application No. 60/481,753, filed on Dec. 8, 2003.

(51) Int. Cl.
*B26D 1/04* (2006.01)
*B32B 38/04* (2006.01)

(52) U.S. Cl. ............................ 83/13; 83/211; 83/370; 83/466.1; 83/522.12; 83/614; 83/648; 83/924

(58) Field of Classification Search .................... 83/13, 83/211, 212, 370, 466.1, 522.12, 522.13, 83/614, 648, 912, 924, 953; 53/381.3
See application file for complete search history.

(56) References Cited

U.S. PATENT DOCUMENTS 4,117,753 A * 10/1978 Friddle et al. ................ 83/143
5,168,786 A * 12/1992 Huggins et al. .............. 83/308
5,431,077 A * 7/1995 Murakami ................... 83/162
5,690,013 A * 11/1997 Kanarek et al. .............. 83/762
5,732,610 A * 3/1998 Halladay et al. .............. 83/871
6,138,545 A * 10/2000 Dueck ......................... 83/614
6,145,427 A * 11/2000 Smith .......................... 83/874
6,202,529 B1 * 3/2001 Hodsdon ..................... 83/870
6,647,850 B1 * 11/2003 Verklan ....................... 83/874
6,715,607 B1 * 4/2004 Wetsch ....................... 206/312
2002/0059859 A1 * 5/2002 Verklan ....................... 83/870
2002/0175090 A1 * 11/2002 Garcia, Jr. ................... 206/1.5
2005/0016668 A1 * 1/2005 Powers et al. .............. 156/250

* cited by examiner

*Primary Examiner*—Charles Goodman
(74) *Attorney, Agent, or Firm*—Dorothy S Morse

(57) ABSTRACT

An efficient and safe device designed to perform the difficult task of opening tightly fitting Shrink Wrap plastic packaging material and security tape around a product or product case, particularly that used for the distribution of CD-ROM'S, DVD'S, videogames, and videotapes. The device quickly cuts a clean slit opening in the Shrink Wrap and security tape along the inserted edge of the packaged product. The cutting element of the device can be in the form of a wire or blade, and function via heating, mechanical cutting action, and/or ultrasonic vibration. A multiple-capacity alignment channel guides various shaped products into proper cutting position. Sensors may activate the cutting/slitting action, with adequate heat, vibration, and/or mechanical cutting being applied for a time period sufficiently long, or until sufficient temperature is reached, to cut through the Shrink Wrap material and security tape without damaging the underlying product or product case.

20 Claims, 6 Drawing Sheets

SHRINK WRAP AND SECURITY TAPE OPENING APPARATUS AND METHOD

CROSS-REFERENCES TO RELATED APPLICATIONS

This application is related to U.S. Provisional Patent Application 60/481,753, filed by the same inventor on Dec. 8, 2003, for substantially the same subject matter, the title of which was 'Package Opener for Shrink Wrap and Security Tape'. All benefit from the above-identified provisional patent application is herein requested.

BACKGROUND OF THE INVENTION

1. Field of the Invention

This invention relates to cutting devices used to open packaging, specifically to a device and method for opening the combined Shrink Wrap packaging and security tape that is commonly employed to package media recording products, such as but not limited to CD-ROM'S, DVD'S, videogames, and videotapes.

2. Description of the Related Art

The advent of the Shrink Wrap plastic packaging film and package security tape has proven to provide a number of advantages for the retail packaging of CD-ROM, DVD, videogames, and videotape media. Among the advantages of this tightly fitting clear plastic Shrink Wrap are, high visibility of product graphics through the crystal clear plastic, all product contents are held and contained together inside the plastic wrap and a high degree of security and protection from tampering and or removal of the product contained within. However, this high degree of protection and security for the packaging contents is a double-edged sword, as the tightly fitting Shrink Wrap plastic packing film and security tape employed proves very difficult for consumers to remove. Some consumers resort to the use of a razor blade, knife, or sharp scissors to cut open this packaging. Using these types of implements for the opening of such packaging can prove to be dangerous not only to the user, but also cause unintentional damage to the product itself.

Anyone who has tried to open such packaging by hand or with a blade knows of the difficulty this task poses. The prior art describes solutions that enclose a blade for user safety, but these devices do little to prevent actual product damage while cutting through the Shrink Wrap packaging and security tape. Additionally such devices are tedious to use, often requiring multiple passes to cut through both the shrink wrap packing material and security tape and the blades used are prone to become dull over time. No opening device for packaging is known that has all of the features and advantages of the present invention.

BRIEF SUMMARY OF THE INVENTION

It is the primary objective of the present invention to provide a rapid, safe, and effective way for purchasers to open the combined Shrink Wrap and security tape packaging that is commonly used for retail of media products, including but not limited to CD-ROM'S, DVD discs, videogames, and videotapes. It is also an objective of the present invention to provide a Shrink Wrap and Security Tape opening device that is compact in configuration and easy-to-use. A further objective of the present invention is to provide a Shrink Wrap and Security Tape opening device that is durable, reliable, and requires little or no maintenance between uses.

The current invention provides an efficient and safe device designed to perform the difficult task of opening tightly fitting Shrink Wrap plastic packaging material and security tape, which are commonly used for sale of CD-ROM'S, DVD discs, videogames, videotapes, and all other digital media. This device will quickly cut a clean slit or slit-like opening in the Shrink Wrap and security tape centrally along any targeted edge of the packaged product. The cutting element of the device is comprised of a heating/cutting element member that could be in the form of a wire or blade and cuts via mechanical movement, heat, vibration, or any combination thereof. A multiple capacity alignment channel serves to guide the various shaped products into proper alignment position with the heating/cutting element member, which is in parallel position relative to the alignment channel. As the packaged product is placed into the alignment channel, sensors activate the heating/cutting element member so as to prepare it for its cutting task. When heat will be used, adequate heat is applied for a sufficiently long time period to cut through the Shrink Wrap material and security tape without damaging the product contained within the packaging. A visual and/or audible indicator may alert a user to periods of present invention operation or the conclusion of its operation. Once a slit is made in the Shrink Wrap and security tape along one edge of a packaged product, additional cuts are typically made in the Shrink Wrap and security tape on other edges of the product packaging for easy book-like opening of the media case to access the contents inside.

The description herein provides preferred embodiments and should not be construed as limiting the scope of the present invention opening device. For example, variations in the size and configuration of the base member; the spatial orientation of the channel, the height and thickness dimensions of the back wall; and the cutting means used; other than those shown and described herein may be incorporated into the present invention. Thus, the scope of the present invention should be determined by the appended claims and their legal equivalents, rather than being limited to the examples given.

DETAILED DESCRIPTION OF THE INVENTION

Figure 1:
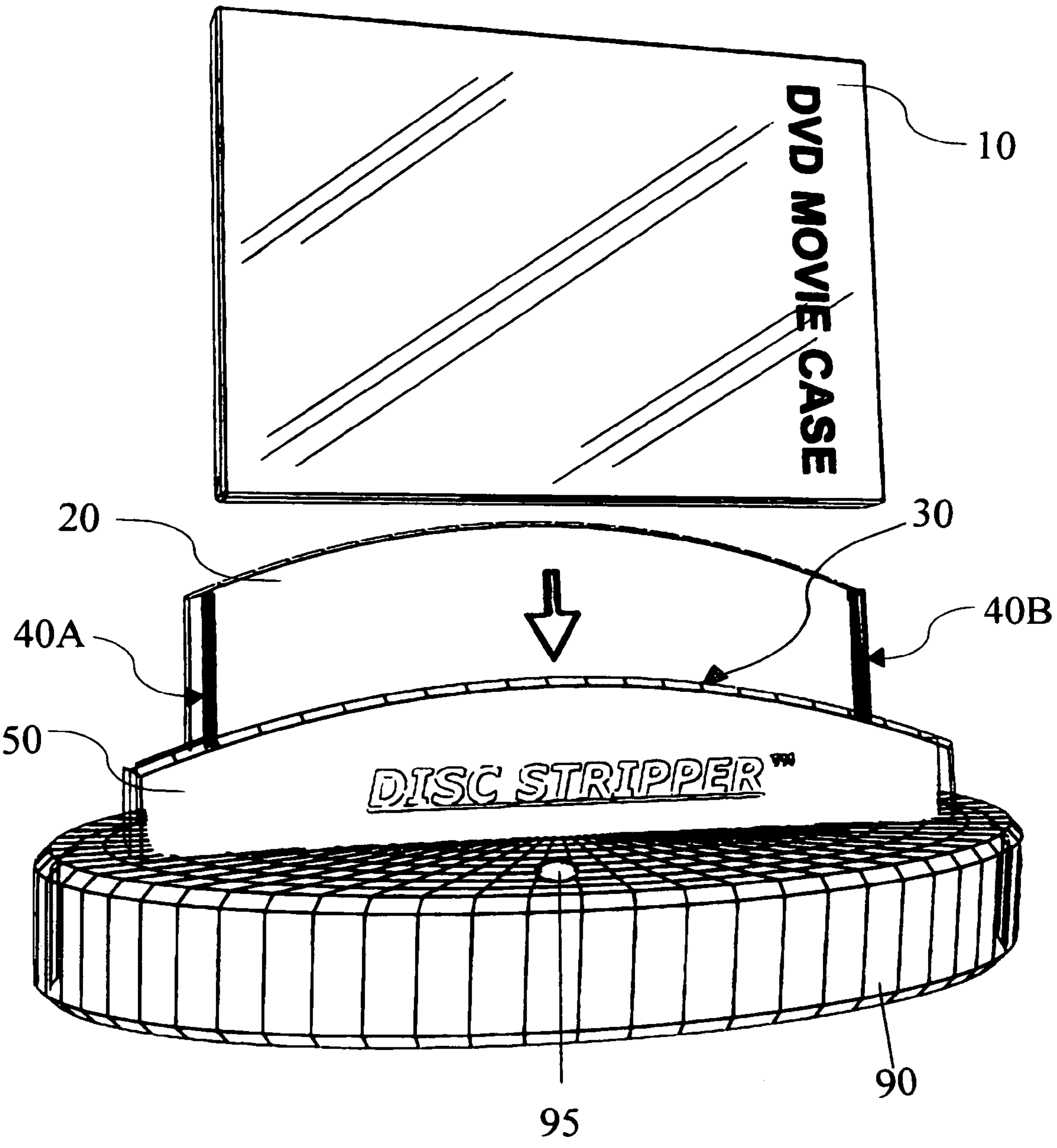
FIG. 1 is a front view of a first preferred embodiment of the present invention with a DVD movie case having Shrink Wrap packaging and security tape positioned above the present invention channel, and an indicator light on the base supporting the channel.
Figure 2:
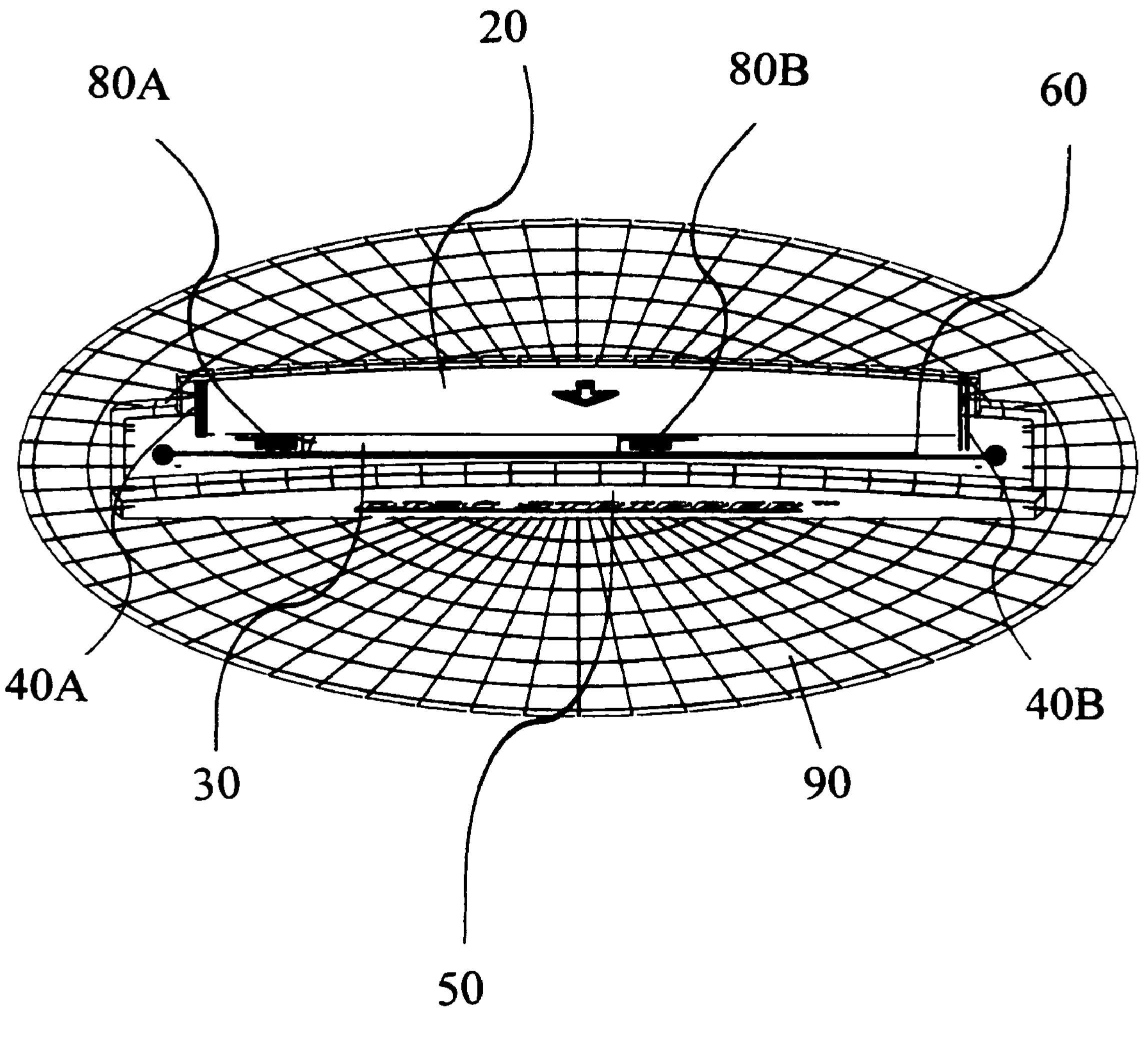
FIG. 2 is a top view of the first preferred embodiment of the present invention with a heating wire and two sensors communicating with the lower end of the channel.

FIGS. 1–4 shows a first preferred embodiment of the present invention that is used for opening the type of Shrink Wrap plastic packaging frequently used on the cases and packaging of DVD discs, CD-ROM'S, videotapes, videogames, and digital and analog media discs and tapes. FIG. 1 shows a DVD case 10 with an outer layer (not separately numbered) of retail Shrink Wrap packaging and security tape that is in need of removal, with DVD case 10 being positioned above and vertically aligned with the first preferred embodiment, prior to its use to open the Shrink Wrap packaging and security tape surrounding DVD case 10. Proper alignment of DVD case 10 for cutting of the Shrink Wrap packaging and security tape is achieved by means of an upwardly-extending back wall 20 that communicates with a downwardly-extending alignment channel 30. A front wall 50 and opposing side walls 40A and 40B, together with back wall 20, define alignment channel 30. Optionally, side walls 40A and 40B may be attached to back wall 20, secured in fixed positioned close to the opposing ends of back wall 20, and/or made adjustable relative to back wall 20 for different sizes of DVD cases 10 and other cases/packaging, such as but not limited to CD-ROM case 70 in FIG. 4. However, in most preferred embodiments of the present invention side walls 40A and 40B would not be attached to front wall 50. The primary function of side walls 40A and 40B is to keep a DVD case 10 properly aligned within channel 30 to prevent product damage while the cut/slit in the Shrink Wrap packaging and security tape is being made, as well as to prevent any portion of DVD case 10 from extending laterally beyond channel 30. As a DVD case 10 travels into the alignment channel 30, front wall 50 also serves to completely trap DVD case 10 in a proper position for cutting the Shrink Wrap packaging and security tape surrounding it without damage to DVD case 10. When the DVD case 10 is fully seated and touching the active end of alignment channel 30, activation sensors (shown by the numbers 80A and 80B in FIG. 2), activate a heating element member (shown by the number 60 in FIG. 2), which then cuts open the Shrink Wrap packaging and any associated security tape on the fully seated edge of inserted DVD case 10. Since the more difficult-to-remove security tape is typically located on more than one edge of a DVD case 10, after the Shrink Wrap packaging and any associated security tape on the first edge of a DVD case 10 is cut, it would then be rotated to allow other sides of DVD case 10 having Shrink Wrap packaging and/or security tape to be inserted into channel 30 for cutting. FIG. 1 also shows an arcuate base 90 positioned beneath and supporting the channel 30 defined by back wall 20 and front wall 50. The perimeter configuration and size of base 90 is not critical, as long as it fulfills its support function, and it may have perimeter configurations other than the elliptical configuration shown. An audio and/or visual indicator 95 may optionally be positioned through base 90 or front wall 50, to denote the time period during which heating element member 60 is activated, or perhaps in the alternative when the cutting/slitting action is complete. In addition, activation sensors 80A and 80B may be configured to activate heating element member 60 for a set period of time to achieve the needed cutting/slitting of the Shrink Wrap packaging and/or security tape, or in the alternative until heating element member 60 reaches the pre-selected temperature at which cutting would occur without damage to DVD case 10. Further, although the first preferred embodiment in FIG. 1 is shown with only one DVD case 10 being processed at a time, it is considered within the scope of the present invention for more than one DVD case 10 or other cases/packaging, such as but not limited to CD-ROM case 70 in FIG. 4, to be cut or slit at one time. Although not limited thereto, for simplicity of operation and reduced product cost, when multiple cases/packing are cut at one time, it is preferred that all cases/packaging opened at one time be similar in size and configuration. The materials used for base 90, back wall 20, front wall 50, and side walls 40A and 40B are not critical, as long they remain unaffected by the heat generated by heating element member 60 and channel 30 is able to provide secure positioning for DVD case 10 and other cases/packaging while Shrink Wrap packaging and/or security tape is being cut/slit. Typically in preferred present invention embodiments, although not critical, side walls 40A and 40B would have identical structure, with side wall 40A being used as a stop for smaller sizes of cases 10. When the Shrink Wrap packaging and/or security tape around smaller size cases 10 is being cut or slit, side wall 40B could be movable toward side wall 40A to make certain that the inserted case 10 is in proper alignment for cutting. In the alternative, side wall 40A could be movable toward side wall 40B, as long as the sensors 80A and 80B shown in FIG. 2 are repositioned accordingly toward side wall 40B. Although not shown, the source of power provided for heating element member 60 is not critical and it is contemplated for the first preferred embodiment of the present invention to be able to use any appropriate source of alternating or direct current. As an option, although not shown, base 90 can be configured with a battery compartment that is accessible through its bottom surface or behind back wall 20.

Figure 3:
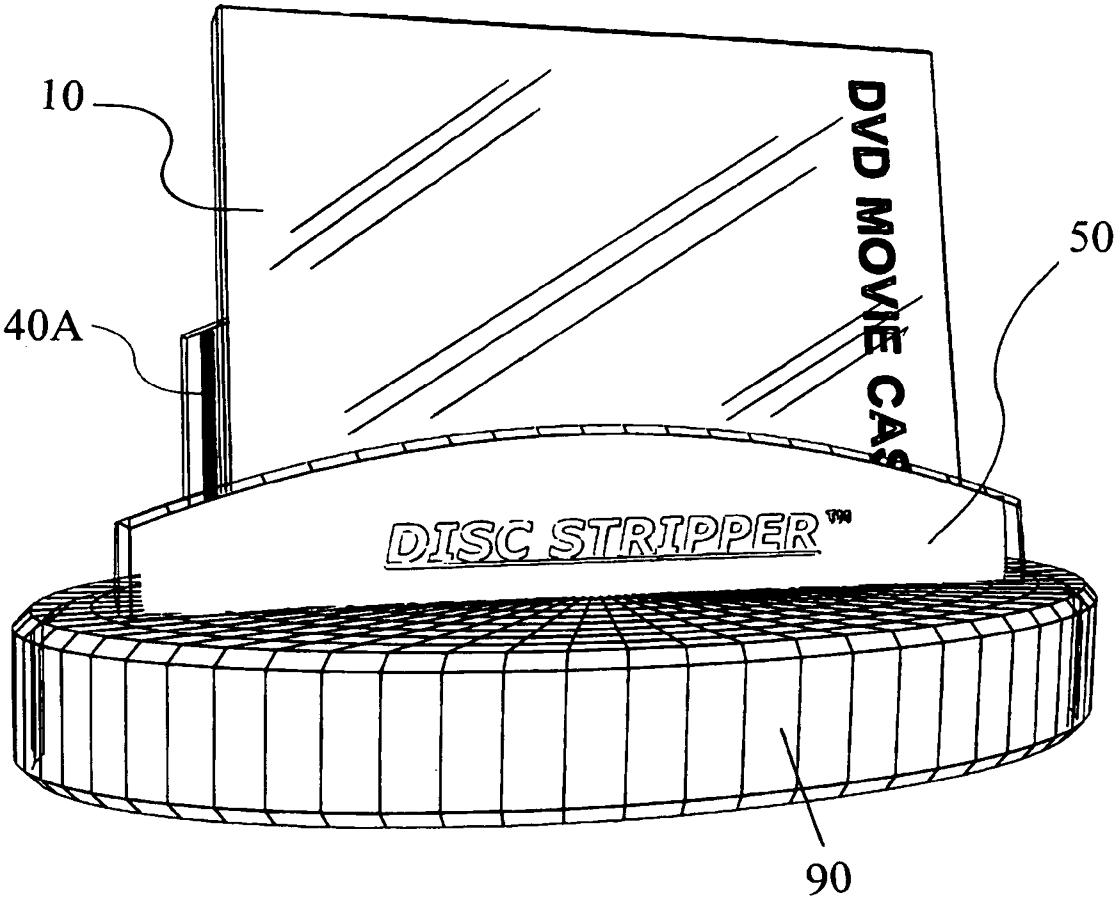
FIG. 3 is a front view of the first preferred embodiment of the present invention with a DVD movie case having Shrink Wrap packaging and security tape being positioned within the present invention's alignment channel for contact with a heating element member or other opening means.
Figure 4:
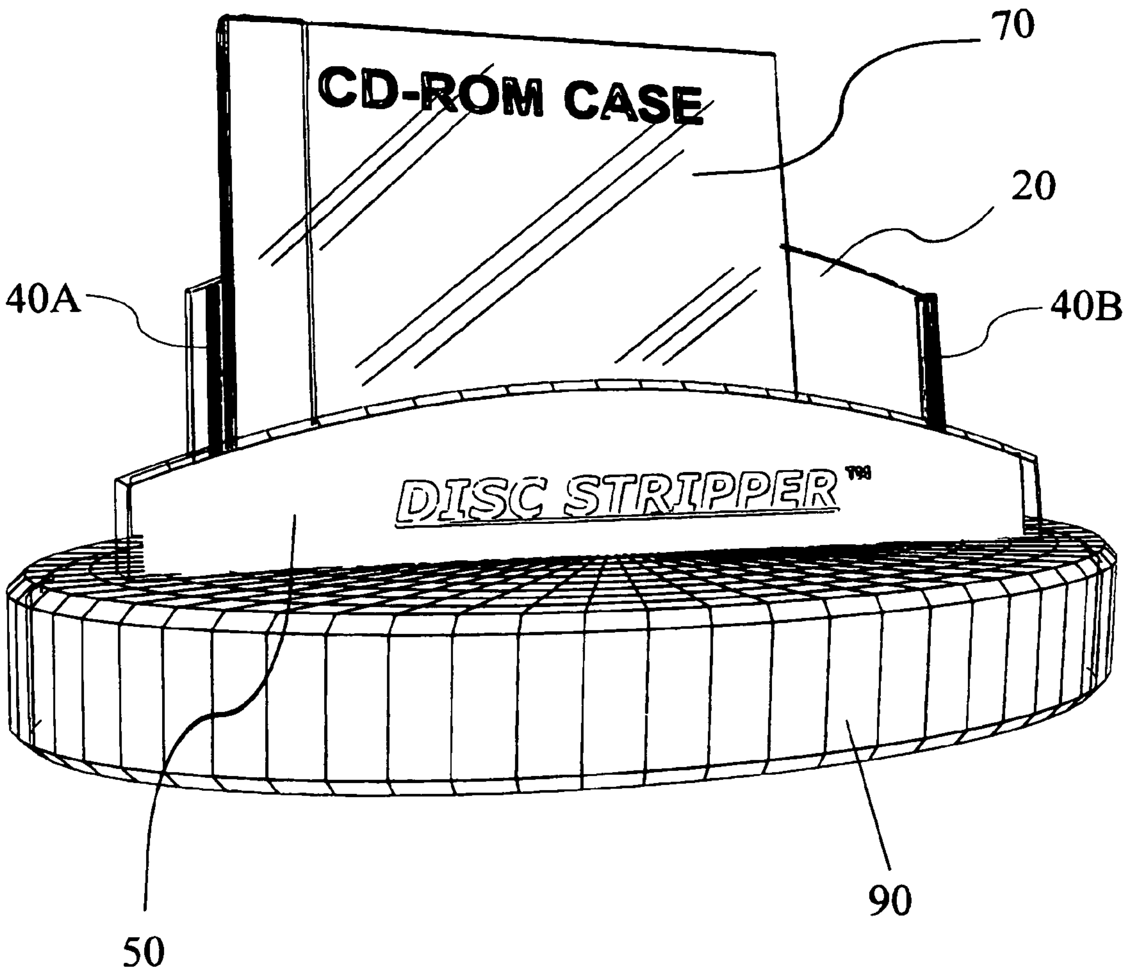
FIG. 4 is a front view of the first preferred embodiment of the present invention with a smaller CD-ROM case having Shrink Wrap packaging and security tape being positioned in the left most portion of the alignment channel for contact with a heating element member or other opening means.

FIGS. 2–4 also show the first preferred embodiment of the present invention. FIG. 2 reveals the positioning of the heating element member 60 used to cut the Shrink Wrap packaging material and security tape around a DVD case 10 or other cases/packaging, which is substantially parallel to the back wall 20 and front wall 50 defining channel 30. Two activation sensors 80A and 80B are also shown, although the number of activation sensors 80A and 80B used may be more or less than the two shown in FIG. 2. If a single activation sensor 80A is used and smaller cases 10 are to be opened by the first preferred embodiment, the sole activation sensor 80A would have to be situated near the side wall 40A or 40B selected for positioning of the smaller cases 10, which in FIGS. 2 and 4 is side wall 40A. In addition, the size and configuration of the activation sensors 80A and 80B shown in FIG. 2 are representative only and should not be used as a limitation for their scope. Further, in the alternative although not shown, a manually activated on/off switch can be substituted in place of sensors 80A and 80B, or be used in conjunction with sensors 80A and 80B. FIG. 2 also shows base 90 as having an oval configuration. In the alternative, base 90 in other preferred embodiments of the present invention may have other perimeter configurations. However, for greatest stability during the cutting/slitting process and when DVD case 10 is inserted and removed from channel 30, although not critical as balance could otherwise be provided, it is preferred for channel 30 to have a centralized position relative to base 90. Side walls 40A and 40B are shown positioned in FIG. 2 near the opposing ends of back wall 20, but not connected to front wall 50. It is not critical for side walls 40A and 40B to be physically connected to back wall 20 as long as they are securely fixed into their usable positions by base 90. Also, FIG. 2 shows heating element member 60 positioned adjacent to front wall 50, the inside surface of front wall 50 having a slightly arcuate configuration allowing its central portion to be used for applying pressure to and biasing a case 10 against back wall 20 during cutting/slitting operations, and heating element member 60 extending laterally beyond side walls 40A and 40B. At a minimum, it is contemplated for heating element member to extend the full width of channel 30. FIG. 3 depicts a target DVD case 10 within alignment channel 30 in a position where the retail Shrink Wrap packaging and security tape around it can be cut or slit without damage to the underlying product inside Shrink Wrap packaging and security tape. Once the Shrink Wrap packaging and security tape on one edge of DVD case 10 is cut, DVD case 10 would be rotated 90° or 180° so that the Shrink Wrap packaging and security tape on other edges of DVD case 10 can also be cut/slit. When heating element 60 is activated for a pre-selected period of time, a user (not shown) can simply remove DVD case 10 or other cases/packaging from channel 30 after that amount of time has elapsed. In the alternative, the indicator 95 shown in FIG. 1 or other similar device can be used via audio, visual, and/or other means to alert a user that cutting of the Shrink Wrap packaging and security tape is complete. The manner in which a user of the present invention is alerted to completion of the cutting/slitting process can be as a result of the presence or absence of an alert signal from indicator 95. Typically, the time required for cutting and/or slitting Shrink Wrap packaging and security tape on media cases 10 and similar packaging is very brief. Although indicator 95 is not shown in FIGS. 2–4, it is still considered an optional feature of the first preferred embodiment of the present invention, as well as other preferred embodiments of the present invention. FIG. 4 depicts a target CD-ROM package 70 within alignment channel 30 and in a position where the Shrink Wrap packaging and security tape around it can be cut. When CD-ROM package 70 or any other cases/packaging does not extend the full width of channel 30, it is placed against one of the side walls 40A or 40B, with FIG. 4 showing CD-ROM package 70 using side wall 40A as its lateral stop. Should 40B instead be used as a lateral stop for CD-ROM package 70, it would be expected for sensors 80A, 80B, or one or more additional sensors 80 (not shown) to be positioned within channel 30 where CD-ROM package 70 would contact it when fully inserted within channel 30.

Figure 5A:
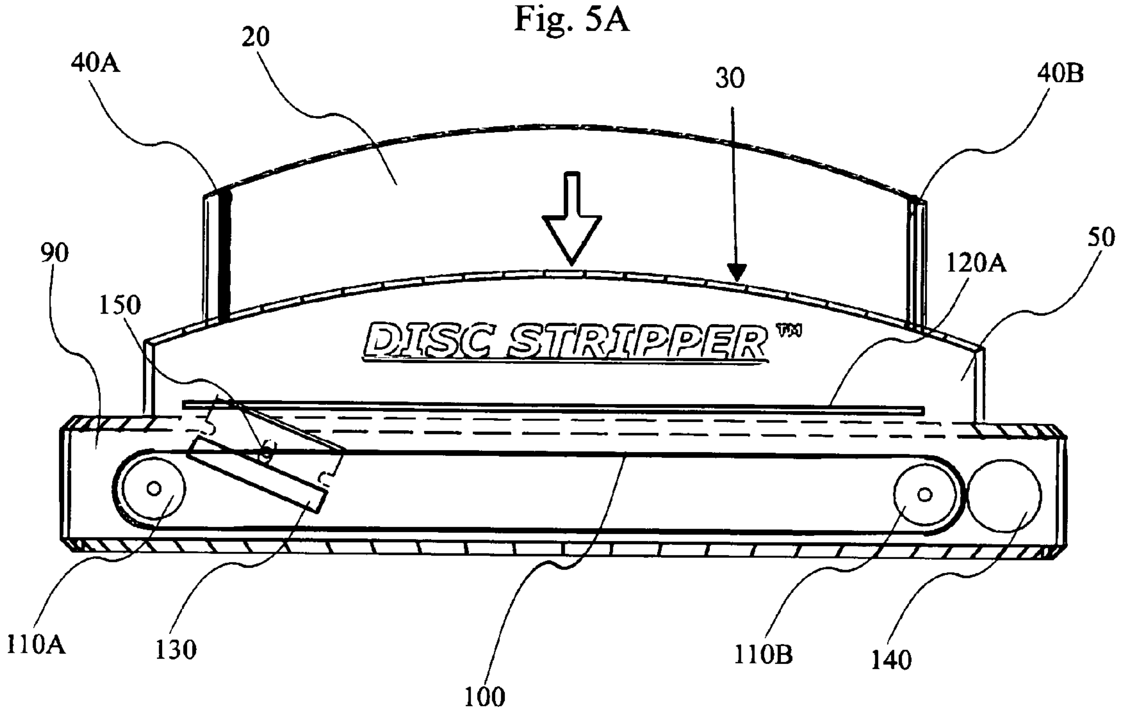
FIG. 5A is a front view of a second preferred embodiment of the present invention having drive means in the bottom portion of the channel that is adapted to pull a cutting blade along a guidance track.
Figure 5B:
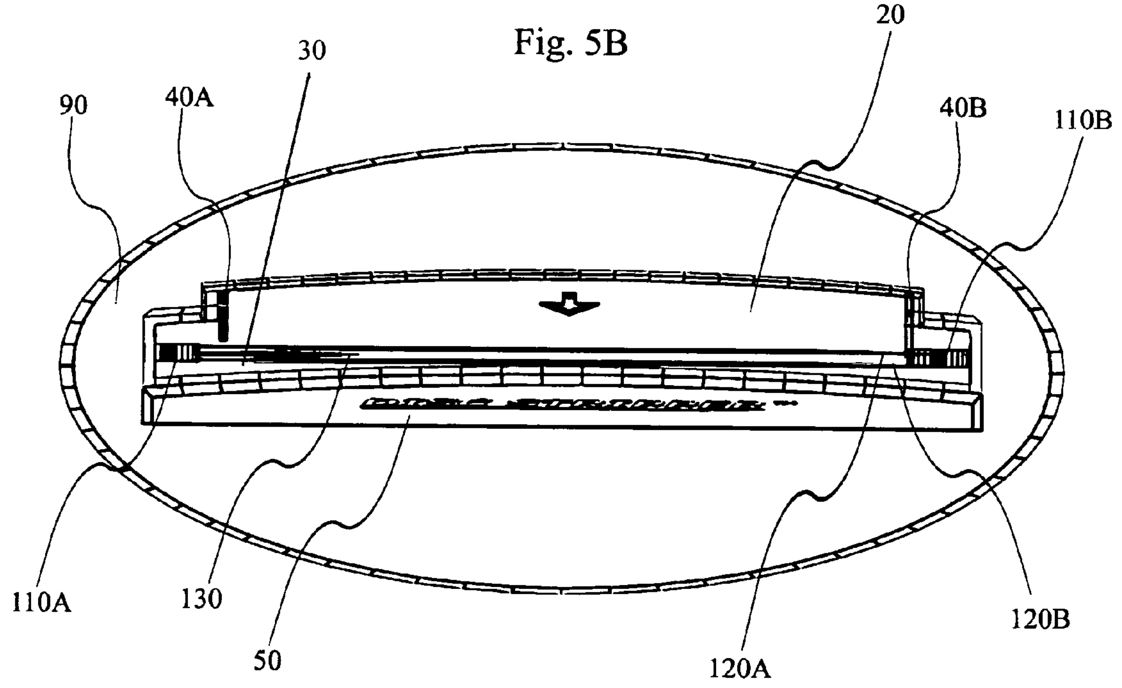
FIG. 5B is a top view of the second preferred embodiment of the present invention.

FIGS. 5A and 5B show a second preferred embodiment of the present invention that has a movable cutting member 130 replacing the heating element member 60 shown in FIG. 2. Movable cutting member 130 extends beyond the side walls 40A and 40B that in combination with back wall 20 and front wall 50 define channel 30. At a minimum, movable cutting member 130 should extend the full width of channel 30. However, it should be noted that although not shown in the accompanying illustrations, use by the present invention of a combination of heating and cutting activity to cut/slit Shrink Wrap packaging and security tape is also considered to be within the scope of the present invention. FIGS. 5A and 5B show an elliptical base 90 supporting a front wall 50, two side walls 40A and 40B, and a back wall 20 that together define a channel 30 where a DVD case 10 or other cases/packaging are inserted for cutting of the retail Shrink Wrap packaging and security tape that surrounds it. The elliptical configuration shown for base 90 is not critical and other perimeter configurations are also contemplated, including but not limited to those that are non-symmetrical, irregularly-shaped, and/or curvilinear. In addition, FIG. 5A shows a drive belt 100 within base 90 that is guided in its movement by two spaced-apart drive wheels or pulleys 110A and 110B. In the alternative, although not shown, it is contemplated for the present invention to include other drive means for its cutting member 130 that allows movement of cutting member 130 across the bottom portion of channel 30 for Shrink Wrap packaging and security tape cutting/slitting purposes. FIG. 5A further shows a rail or track 120A that is used to guide cutting member 130 along a linear path centrally down the fully inserted edge of a DVD case 10, CD-ROM packaging 70, or other cases/packaging (not shown) during its cutting of Shrink Wrap packaging and security tape without damage to the product it protects. The circle designated as 140 in FIG. 5A represents the motor or other drive means used for movement of cutting member 130, and is not meant to be indicative of the size and shape of drive means 140. Further, FIG. 5A shows cutting member 130 being in the form of a single edged razor blade, although not limited thereto, and secured for movement via a horizontally-extending shaft 150, the end of which is visible in FIG. 5A. Due to the angle at which the upwardly-extending sharp edge of cutting member 130 is positioned, it is contemplated in the second preferred embodiment of the present invention for cutting member 130 to travel from side wall 40A to toward side wall 40B during the cutting of Shrink Wrap packaging and security tape. However, it is equally contemplated for cutting member 130 to travel from side wall 40B to toward side wall 40A during the cutting of Shrink Wrap packaging and security tape, wherein cutting member 130 would be angled in an orientation that is substantially the mirror image of that shown in FIG. 5A, or similarly effective cutting angle. FIG. 5B also identifies a second rail/track 120B that is not illustrated in FIG. 5A. It should be remembered that all of the dimensions, relative positioning, and orientations of components shown in FIGS. 5A and 5B are merely representative of one preferred embodiment of the present invention, and the scope of the present invention should be determined by the appended claims. It should also be noted that although FIGS. 1–4, 5A and 5B, as well as 6A and 6B, show the present invention base 90 positioned under an upwardly-extending channel 30 defined by front wall 50, side walls 40A and 40B, and back wall 20, it is equally contemplated for channel 30 to have a horizontally-extending or downwardly-extending orientation, as well as oblique orientations. It is contemplated that attachment of base 90 to any needed surface (not shown), whether channel 30 is upright or in any other orientation, would be via conventional means.

Figure 6A:
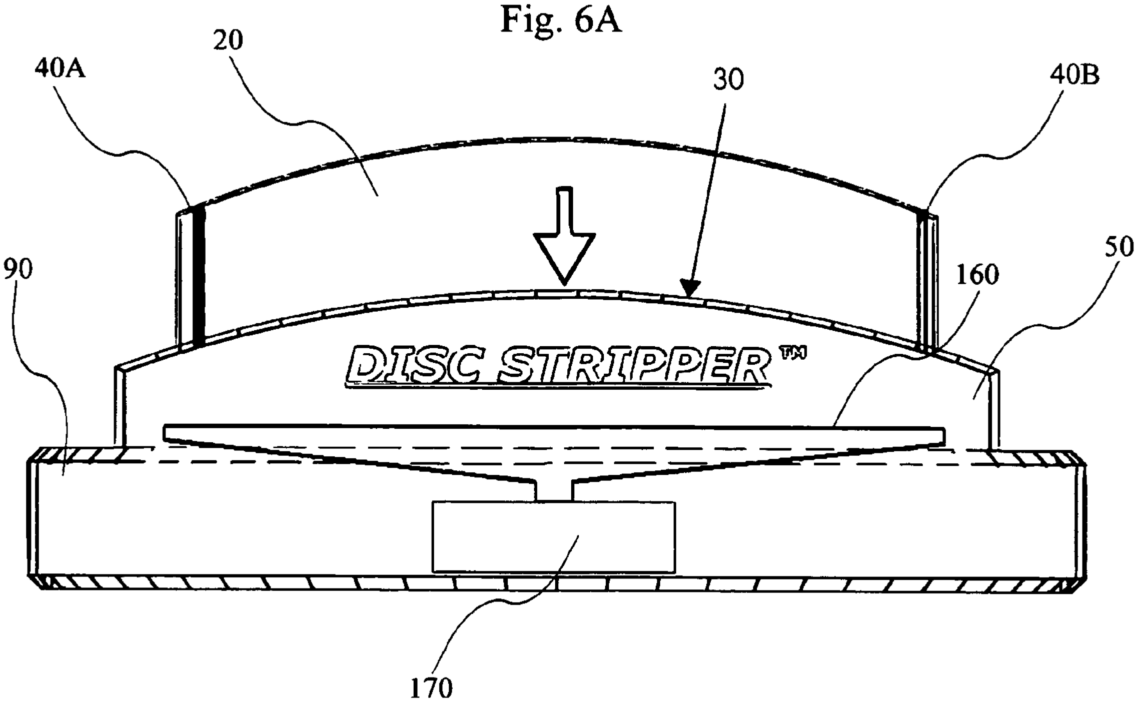
FIG. 6A is a front view of a third preferred embodiment of the present invention having ultrasonic opening means for Shrink Wrap packaging and security tape and two sensors for activation thereof.
Figure 6B:
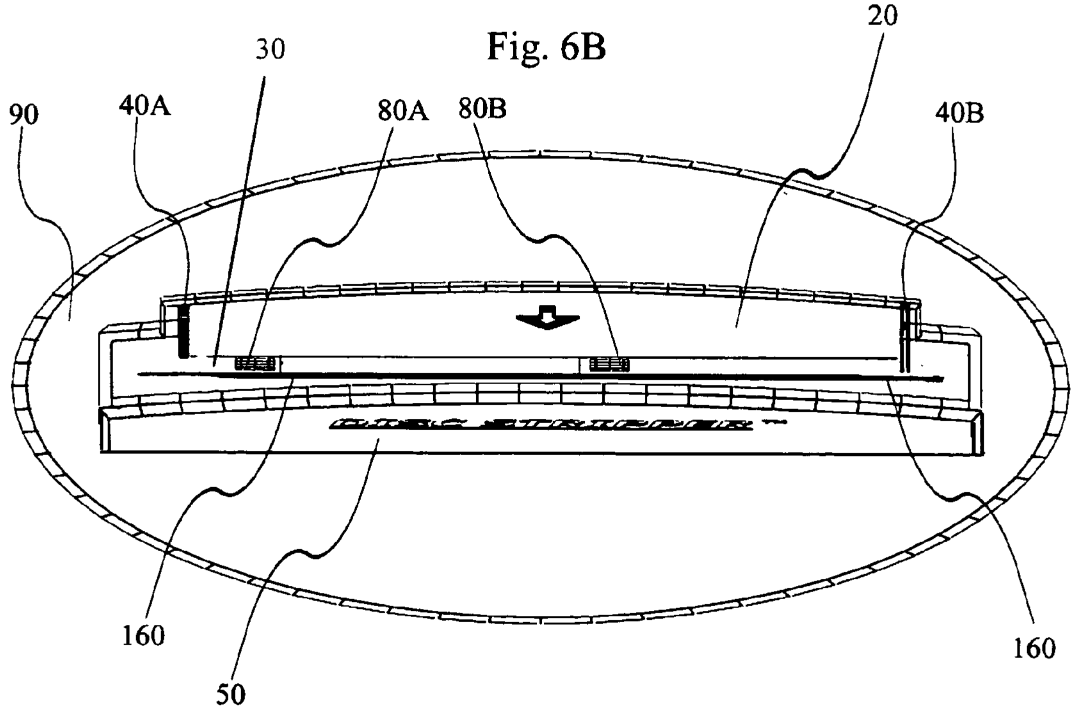
FIG. 6B is a top view of the third preferred embodiment of the present invention.

FIGS. 6A and 6B show a third preferred embodiment of the present invention that has an elongated ultrasonic cutting means 160, which extends beyond the side walls 40A and 40B that in combination with back wall 20 and front wall 50 define channel 30. At a minimum, it is contemplated for ultrasonic cutting means 160 to extend the full width of channel 30. The ultrasonic horn transducer 160 used as the cutting/slitting means in FIG. 6A, and which is long and thin like a knife blade, is vibrated by ultrasonic energy to produce heat and mechanical action that provide the means by which the Shrink Wrap packaging and security tape are cut/slit. FIGS. 6A and 6B show an elliptical base 90 supporting front wall 50, side walls 40A and 40B, and back wall 20 that together form the channel 30 where a DVD case 10 or other cases/packaging are inserted for cutting Shrink Wrap packaging and security tape without damage to the underlying product and product packaging. The perimeter configuration and size of base 90 is not critical, as long as it fulfills its support function, and it may have perimeter configurations other than that shown in FIGS. 6A and 6B. In addition, FIG. 6A shows an electronic ultrasonic driver 170 within base 90 that is connected to the ultrasonic horn transducer 160 communicating with the lower portion of channel 30. FIG. 6A further shows the ultrasonic horn transducer 160 being positioned adjacent to front wall 50, and two activating sensors 80A and 80B also communicating with the bottom portion of channel 30 that are used to trigger the vibration of ultrasonic horn transducer 160 once a DVD case 10 or other cases/packaging reached its fully inserted position within channel 30. The shape and relative size of the electronic ultrasonic driver 170 shown in FIG. 6A is representative only and not meant to be determinative thereof. Thus, use of any of the preferred embodiments of the present invention makes the opening of retail of Shrink Wrap packaging and security tape much easier to accomplish, with access to the contents of the DVD case 10 or other cases/packaging within the opened Shrink Wrap being achieved in a very brief period of time, typically a matter of seconds, and without injury to the operator or damage to the DVD case 10, other cases/packaging, and/or the contents thereof.

I claim:

1. A method for prompt and easy opening of the type of tightly-fitting outer plastic packaging film frequently used on the cases and packaging of DVD discs, CD-ROM'S, videotapes, videogames, and digital and analog media discs and tapes, said method comprising the steps of:

providing a cutting member, a back wall, two side walls, a front wall, at least one activation means adapted for causing said cutting member to make a clean cut in tightly-fitting outer plastic packaging film, and a base;

using said base to support said back wall, said front wall, and said side walls to form a channel configured to accommodate the insertion of at least one packaging item surrounded by tightly-fitting outer plastic packaging film;

designating one end of said channel to be an active end where cutting of tightly-fitting outer plastic packaging film will take place;

positioning said cutting member in communication with said active end of said channel; and placing said activation means in association with said cutting member so that when said at least one packaging item is fully inserted into said channel and said activation means is energized, said activation means causes said cutting member to make a clean cut through said tightly-fitting outer plastic packaging film without damaging said underlying at least one packaging item.

2. The method of claim 1 wherein said back wall is taller than said front wall for use as a packaging alignment guide.

3. The method of claim 1 wherein said cutting member is selected from a group consisting of heated wires, vibrating wires, heated blades, vibrating blades, cutting blades, and cutting blades moving laterally within said channel.

4. The method of claim 1 wherein cutting of said tightly-fitting outer plastic packaging film is accomplished via means selected from a group consisting of devices capable of cutting tightly-fitting outer plastic packaging film through the use of heat, mechanical cutting devices, and devices capable of cutting tightly-fitting outer plastic packaging film through the use of ultrasonic vibration.

5. The method of claim 1 wherein said cutting member is also configured to cut through the security tape commonly used on retail packaging without damaging said underlying at least one packaging item.

6. The method of claim 5 wherein said cutting member is also configured to cut through both the tightly-fitting outer plastic packaging film and security tape used on retail packaging in one action.

7. The method of claim 1 further comprising a step of providing an indicating means adapted for signaling a user when cutting action is complete, and a step of electrically connecting said indicating means to said activation means.

8. The method of claim 1 further comprising a step of providing an indicating means adapted for signaling a user that cutting action is taking place and a step of electrically connecting said indicating means to said activation means.

9. A device for prompt and easy opening of the type of tightly-fitting outer plastic packaging film frequently used on the cases and packaging of DVD discs, CD-ROM'S, videotapes, videogames, and digital and analog media discs and tapes, said device comprising:

a cutting member adapted for making a clean cut through tightly-fitting outer plastic packaging film;

an alignment channel defined by a back wall, opposing side walls, and a front wall, with said alignment channel configured to accommodate the insertion of at least one packaging item surrounded by tightly-fitting outer plastic packaging film and placement of said at least one packaging item against said cutting member whereby upon said at least one packaging item reaching a fully inserted position within said channel, said cutting member is able to make a clean cut through said tightly-fitting outer plastic packaging film without damaging said underlying at least one packaging item; and activation means adapted for causing said cutting member to make a clean cut in tightly-fitting outer plastic packaging film surrounding said at least one packaging item when it is fully inserted into said channel.

10. The device of claim 9 further comprising a base configured for support of said alignment channel and said cutting member in proper relation to one another to allow said tightly-fitting outer plastic packaging film to be promptly cut without damaging said underlying at least one packaging item.

11. The device of claim 9 wherein said cutting member is selected from a group consisting of heated wires, vibrating wires, heated blades, vibrating blades, cutting blades, and cutting blades moving laterally within said channel.

12. The device of claim 9 wherein cutting of said tightly-fitting outer plastic packaging film is accomplished via means selected from a group consisting of devices capable of cutting plastic packaging film through the use of heat, mechanical cutting devices, and devices capable of cutting plastic packaging film through the use of ultrasonic vibration.

13. The device of claim 9 wherein said cutting member is also configured to cut through the security tape commonly used on retail packaging without damaging said underlying at least one packaging item.

14. The device of claim 13 further wherein said cutting member is configured to cut through both the tightly-fitting outer plastic packaging film and security tape used on retail packaging in one action.

15. The device of claim 9 further comprising indicating means selected from a group consisting of indicators adapted for signaling a user when cutting of the tightly-fitting outer plastic packaging film is complete, and indicators adapted for signaling a user that cutting of the tightly-fitting outer plastic packaging film is taking place.

16. A device for prompt and easy opening of the type of tightly-fitting outer plastic packaging film frequently used on the cases and packaging of DVD discs, CD-ROM'S, videotapes, videogames, and digital and analog media discs and tapes, said device comprising:

a cutting member adapted for making a clean cut through tightly-fitting outer plastic packaging film;

an alignment channel defined by a back wall, opposing side walls, and a front wall, with said alignment channel configured to accommodate the insertion of at least one packaging item surrounded by tightly-fitting outer plastic packaging film and placement of said at least one packaging item against said cutting element member whereby upon said at least one packaging item reaching a fully inserted position within said channel, said cutting member is able to make a clean cut through said tightly-fitting outer plastic packaging film without damaging said at least one packaging item; and a base configured for support of said alignment channel and said cutting member in proper relation to one another to allow the tightly-fitting outer plastic packaging film around a packaging item to be promptly cut when the packaging item is fully inserted into said channel.

17. The device of claim 16 wherein cutting of said tightly-fitting outer plastic packaging film is accomplished via means selected from a group consisting of devices capable of cutting tightly-fitting outer plastic packaging film through the use of heat, mechanical cutting devices, and devices capable of cutting tightly-fitting outer plastic packaging film through the use of ultrasonic vibration.

18. The device of claim 16 wherein said cutting member is also configured to cut through the security tape commonly used on retail packaging without damaging said underlying at least one packaging item.

19. The device of claim 18 wherein said cutting member is also configured to cut through both the tightly-fitting outer plastic packaging film and security tape used on retail packaging in one action.

20. The device of claim 16 further comprising indicating means, and whereas said indicating means is selected from a group consisting of indicators adapted for signaling a user when cutting of tightly-fitting outer plastic packaging film is complete and indicators adapted for signaling a user that cutting of tightly-fitting outer plastic packaging film is taking place.

* * * * *